FIG. 1
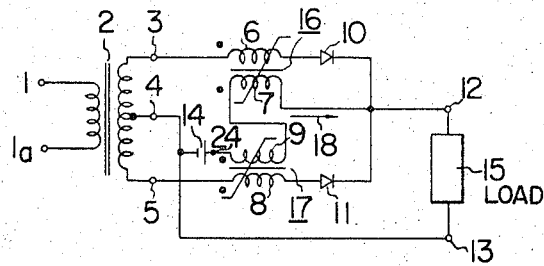
FIG. 2(a)   FIG. 2(b)   FIG. 2(c)
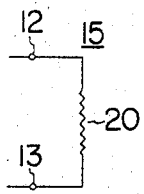 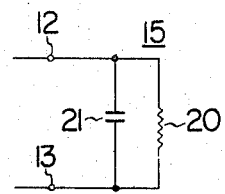 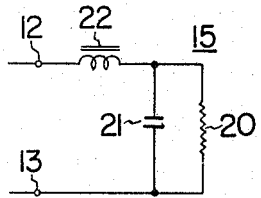
FIG. 3(a)
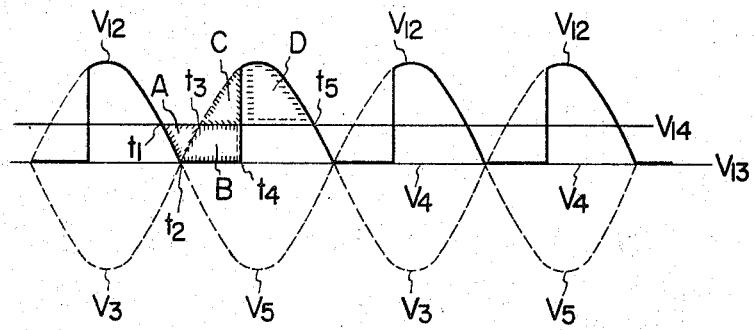

United States Patent Office 3,422,341
Patented Jan. 14, 1969

3,422,341
RECTIFYING APPARATUS FOR PRODUCING
CONSTANT D.C. OUTPUT VOLTAGE
Toshio Kurimura, 2069—2, Kitami-machi, Setagaya-ku, Tokyo-to, Japan, and Kazuomi Yamamura, 12, 4-chome, Toytoamanaka, Nerima-ku, Tokyo-to, Japan
Filed June 14, 1966, Ser. No. 557,548
Claims priority, application Japan, June 18, 1965, 40/36,001; Oct. 14, 1965, 40/62,655
U.S. Cl. 321—18    4 Claims
Int. Cl. H02m 1/08; 7/00

ABSTRACT OF THE DISCLOSURE

Rectifying apparatus for supplying a direct-current obtained from an alternating-current voltage source to a load comprises reactor-rectifier combinations controlled by control means for controlling said reactor-rectifier combinations to commutate the current flowing in the main windings of the reactors. The control means comprises at least one series connection of at least two auxiliary windings of the reactors and a direct voltage source and is adapted to apply to the series connections of the auxiliary windings of those reactor-rectifier combinations which are conductive in different periods of the alternating current voltage, a voltage which is a function of the difference between the direct reference voltage of the direct voltage source and the voltage appearing in operation at said output terminals so as to provide a stabilized direct current voltage across the load.

---

This invention relates to a rectifying apparatus for producing a constant D.C. voltage from an alternating current by the use of a plurality of saturable reactors.

Electric and electronic devices and automatic control devices using these devices are widely applied in all fields of industry. In most cases, these devices require highly regulated D.C. power sources of high capacity. To meet this requirement, many kinds of regulated D.C. power sources have heretofore been proposed. One of them is a regulated power source using saturable reactors which operate as a magnetic amplifier. This conventional D.C. power source, however, has many disadvantages, such as slow regulation response with respect to a sudden fluctuation of input A.C. voltage or of output D.C. current and ready occurrence of hunting if the source is adjusted to operate with a relatively high regulation response to such fluctuation. To overcome these imperfections, rectifying devices using semiconductor elements, such as silicon controlled rectifiers, have been developed. In these devices, there are still such pending problems as complicated construction, relatively narrow range of applicable temperatures due to the temperature characteristics of the elements, not greatly improved hunting suppression and regulation response characteristics, and relatively low reliability of the semiconductor elements. In view of the great trouble and adverse effect on the peripheral circuitry caused by a failure in a D.C. power source, the reliability and regulation characteristics of the D.C. power source must be particularly considered as being of high importance to the device being supplied.

An object of this invention is to provide a rectifying apparatus of high power capacity for producing a constant D.C. output voltage from an alternating current in which the above described problems associated with conventional devices are solved with a simple composition and arrangement, and the response time for compensation action with respect to fluctuations in the A.C. input voltages or D.C. load current is higher than those in conventional devices.

A feature of this invention for attaining said object is that a plurality of auxiliary windings each wound on respective main saturable reactors are connected in series so as to form at least one series connection across which a difference voltage between a D.C. reference voltage and the rectified output voltage is applied, whereby the average value of the rectified output voltage is stabilized at a substantially constant D.C. voltage regardless of fluctuations of the voltage of the A.C. source and of the load current.

According to the present invention there is provided a rectifying apparatus comprising a plurality of saturable reactors, a plurality of rectifiers connected in series respectively therewith to form reactor-rectifier combinations, and A.C. supply source terminals to supply A.C. power to the reactor-rectifier combinations, each of said reactors having an auxiliary winding, the reactors being controlled by at least one control circuit, which is inclusive of the auxiliary windings and a D.C. voltage source, such a manner that the rectified current is commutated successively to the reactor-rectifier combinations thereby to stabilize the resulting rectified output to be applied to a load, characterized in that the auxiliary windings coupled to the reactor-rectifier combinations which are conductive in respectively different periods are connected in series, and that a difference voltage between the voltage of the D.C. voltage source and a voltage proportional to the rectified D.C. output voltage is applied to the series-connected auxiliary windings, whereby the rectified D.C. output voltage is stabilized thereby to have a substantially constant average value irrespective of fluctuations of the voltage of the supplied A.C. power and fluctuations of the rectified D.C. current flowing through the load.

The nature and details of this invention, as well as the manner in which its objects and numerous advantages may best be achieved, will be more clearly apparent by reference to the following detailed description of a few preferred embodiments of the invention, taken in conjunction with the accompanying drawings in which the same and equivalent parts are designated by the same reference numerals and letters, and in which:

FIG. 1 is a circuit diagram of an embodiment of this invention applied to full-wave rectification of single-phase A.C. power;

FIGS. 2(a), 2(b) and 2(c) are schematic diagrams of loads to be applied respectively to the apparatus of this invention;

FIGS. 3(a), 3(b), 4, and 5 are waveform diagrams indicating the operation of the embodiment shown in FIG. 1;

FIGS. 6(a) and 6(b) are graphical representations indicating the characteristics of the saturable reactors to be used in the apparatus of this invention;

FIGS. 7, 8, and 10 are circuit diagrams of other embodiments of this invention applied to full-wave rectification of single-phase A.C. power;

Figure 14:
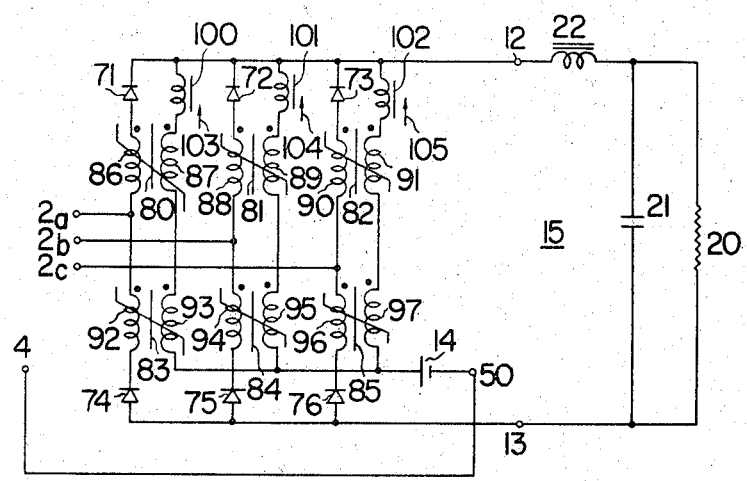
Figure 15:
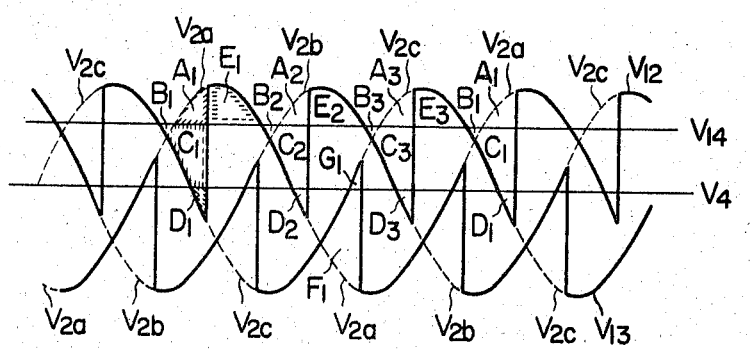
Figure 16:
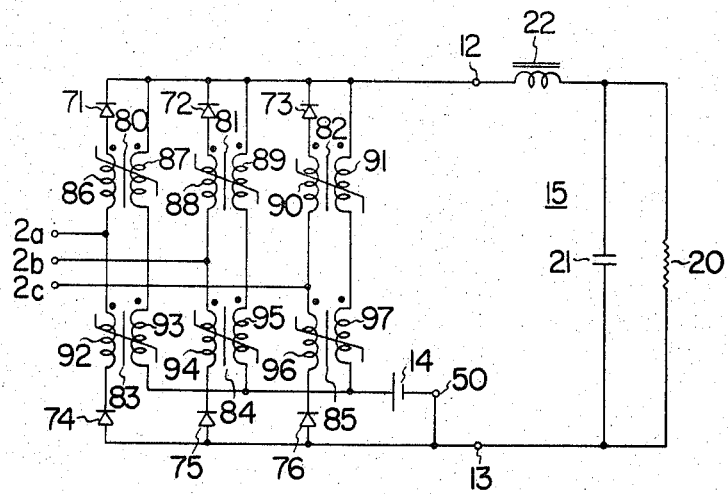
Figure 17:
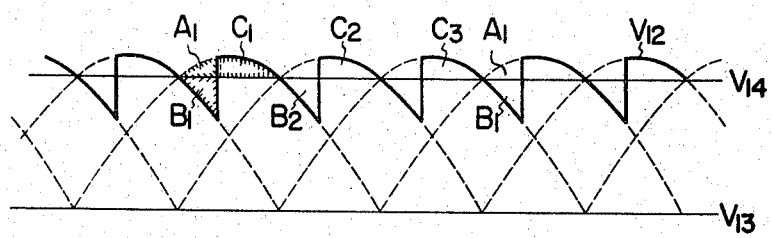
Figure 20:
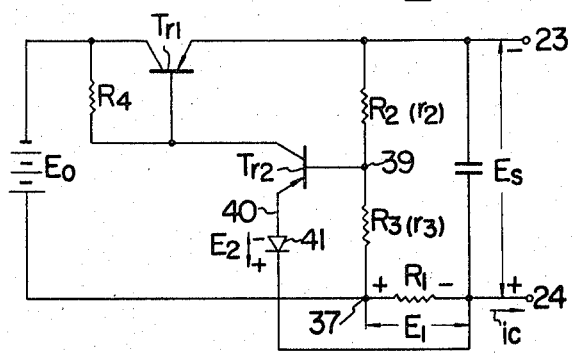
Figure 21:
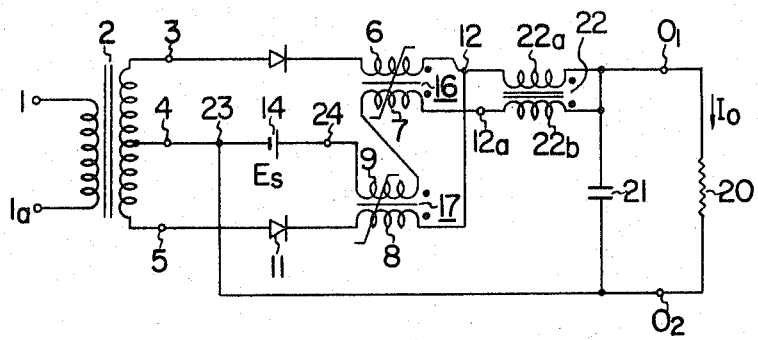

FIGS. 14, 16, 18, and 19 are circuit diagrams of embodiments of this invention applied to full-wave rectification of three-phase A.C. power;

FIGS. 15 and 17 are waveform diagrams indicating the operations of the embodiments shown in FIGS. 14 and 16, respectively;

FIG. 20 is a circuit diagram illustrating an example of a D.C. voltage source to be used in the rectifying apparatus in accordance with the invention; and FIG. 21 is a circuit diagram illustrating another embodiment of this invention applied to full-wave rectification of single-phase A.C. power.

Referring first to FIGURES 1, 2(a), 2(b) and 2(c), the application of the present invention to full-wave rectification of single-phase A.C. power will be described. The essential parts of the embodiment shown in FIG. 1 are a power transformer 2 with A.C. input terminals 1 and $1_a$ and secondary winding terminals 3, 4 and 5 (where terminal 4 is neutral), main rectifiers 10 and 11, saturable reactors 16 and 17, the main windings 6 and 8 of which are connected between the respective secondary winding terminals 3 and 5 of the power transformer 2 and the main rectifiers 10 and 11, respectively, series-connected auxiliary windings 7 and 9 of the saturable reactors 16 and 17, and a referenced D.C. voltage source 14. The series-connected auxiliary winding 7 and 9 are connected across a rectified D.C. output terminal 12 and a terminal of the D.C. voltage source 14, and the other terminal of the D.C. voltage source 14 is connected to the centre tap 4. The rectified output is applied to a load 15.

Various kinds of loads can be connected as the load 15. FIGS. 2(a), 2(b) and 2(c), illustrating examples of such loads, show respectively a resistance load 20, a capacitive load composed of a resistance 20 and a capacitor 21 connected in parallel, and an inductive load composed of a choke-coil 22 and the capacitive load connected in series.

FIG. 3(a) shows a waveform diagram for describing the operation of the embodiment of FIG. 1, in which the resistance load 20 is employed as the load 15. Waveforms designated by references $C_3$, $V_4$, $V_5$, $V_{12}$ and $V_{14}$ illustrate voltages of corresponding parts 3, 4, 5, 12 and 14, respectively, shown in FIGS. 1 and 2(a). The voltage $V_{12}$ represented by the thick full line is the rectified output voltage which is obtained by suppressing only a part of the A.C. voltages $V_3$ and $V_5$ with respect to each cycle thereof (for example, the area designated by B and C) through choking action of the saturable reactors 16 and 17.

If the voltage $V_5$ is positive and the reactor 17 is saturated, voltages $V_5$ and $V_{12}$ will be substantially equal to each other. In this condition, if the voltage $V_{12}$ becomes lower than the voltage $V_{14}$ of the D.C. source 14 (i.e.; the period $t_1$ to $t_2$), a current will flow through the series-connected auxiliary windings 7 and 9 in the direction designated by arrow 18, and the reactor 16 which has been reset in the non-saturated condition as described hereinafter will be magnetized. Since the reactor 17 is previously saturated as described above, a difference between voltages $V_{12}$ and $V_{14}$ will be applied to the auxiliary winding 7 only. After the time $t_2$, the voltage $V_3$ is positive, but the rectifier 10 cannot be conductive in the period $t_2$ to $t_3$ if the voltage induced in the winding 6 by the terminal voltage (i.e.; the difference between the voltages $V_{14}$ and $V_{12}$) of the auxiliary winding 7 is higher than the voltage $V_3$.

If the ratio of the number of turns of the main winding 6 to the number of turns of the auxiliary winding 7 is, for example, 1:1, the rectifier 10 cannot be conductive unless the voltage $V_3$ exceeds the voltage $V_{14}$. When the voltage $V_3$ exceeds the voltage $V_{14}$ after the time $t_3$, the rectifier 10 assumes its conductive state, and the reactor 16 is magnetized by the voltage-time integral corresponding to the different voltage between the voltages $V_3$ and $V_{12}$ which is applied to the main winding 6. Accordingly, the voltage induced in the auxiliary winding 7 exceeds the voltage $V_{14}$. The voltage-time integral of this excess voltage over the voltage $V_{14}$ corresponds to the area indicated by C and causes a current to flow in the direction counter to arrow 18 thereby to demagnetize the reactor 17 by the area indicated by C.

As is apparent from the above described operation, the voltage-time integral of magnetization of the saturable reactor 16 is equal to the sum of the areas A, B and C. The reactor 16 is saturated at a time $t_4$ when the sum of the areas A, B and C becomes equal to the voltage-time integral of the previous demagnetization of the reactor 16, and the rectified output voltagt $V_{12}$ becomes equal to the voltage $V_3$. After the reactor 16 reaches its saturated condition, the current flowing through the series-connected auxiliary windings 7 and 9 is still in the reverse direction of arrow 18, and the reactor 17 is further demagnetized by the voltage-time integral corresponding to the area of the FIGURE D. After a time $t_5$, the voltage $V_{12}$ (i.e.; $V_3$) becomes lower than the voltage $V_{14}$. Accordingly, the reactor 17 is magnetized with the reactor 16 in a similar manner as described above.

As a summary of the above description, it may be said that, with reference to any of the saturable reactors 16 and 17, the voltage-time integral of demagnetization is equal to the sum of the areas corresponding to C and D, and the voltage-time integral of magnetization is equal to the sum of the areas corresponding to A, B and C. When these two sums of areas are equal to each other as a characteristic of a saturable reactor, the following equation is valid.

$$A+B+C=C+D \qquad (1)$$

Therefore, $$A+B=D \qquad (2)$$

Equation 2 indicates that the average value of the rectified output voltage is equal to the voltage of the D.C. voltage source 14.

Figure 3B:
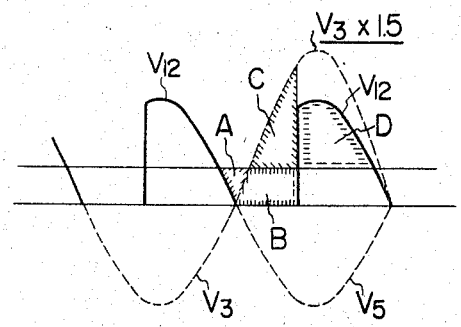

It has been assumed, in the above description, that the ratio of the number of turns of the main winding to the number of turns of the auxiliary winding is 1:1 in the saturable reactor (16 or 17). Equations 1 and 2 are, however, valid under any value of the ratio (e.g., 1:1.5 as shown in FIG. 3B), whereby stabilization of the average value of the rectified output can be attained irrespective of the value of this ratio.

Figure 4:
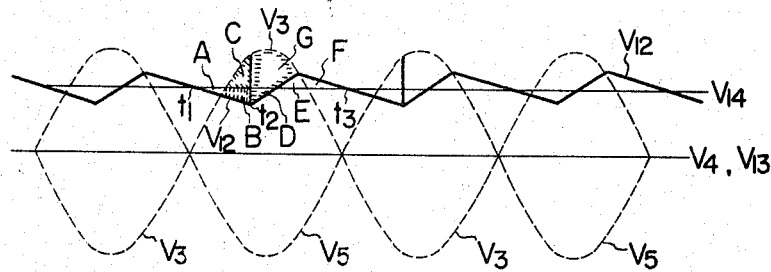

FIG. 4 shows a waveform diagram for describing the operation of the embodiment of the invention shown in FIG. 1 in which the capacitive load (20, 21) shown in FIG. 2(b) is employed as the load 15. The waveforms indicate the voltages of the respective parts designated by corresponding subscripts. In order to simplify the description, it is assumed that the turn ratio of the main winding (6 or 8) to the auxiliary winding (7 to 9) is 1:1 in the saturable reactor (16 or 17). At the time $t_1$, the output voltage $V_{12}$ becomes equal to the voltage $V_{14}$ of the D.C. voltage source. After the time $t_1$, a current is caused to flow in the direction shown by arrow 18 through the series-connected auxiliary windings 7 and 9 by a difference voltage between voltages $V_{12}$ and $V_{14}$. As a result of this current, a voltage-time integral designated by A is applied divisionally to the respective auxiliary windings 7 and 9 of the saturable reactors 16 and 17, so that the reactor 16 and 17 are magnetized so as to approach their saturated condition.

If the magnetization characteristics of the reactors 16 and 17 are equal, the voltage-time integral designated by A is divided into two equal parts which are respectively applied to the reactors 16 and 17. After the voltage $V_3$ exceeds the voltage $V_{12}$, the rectifier 10 assumes its conductive state, and the reactor 16 is magnetized by a voltage-time integral designated by B and C and reaches its saturated condition at a time $t_2$. This voltage-time integral B and C causes a voltage to be induced in the auxiliary winding 7. Since this inducted voltage is superposed on the voltage $V_{12}$, a current flows in the series-connected auxiliary windings 7 and 9 in the direction reverse to that of the arrow 18, thereby to demagnetize the reactor 17 by a voltage-time integral designated by C. After $t_2$, the capacitor 21 is charged by a current which produces a voltage drop equal to the difference between voltages $V_3$ and $V_{12}$ on the resistance component (resistances for D.C. current of the windings of the transformer 2 and of the reactors 16 and 17). This voltage drop corresponds to a voltage-time integral designated by D and G. Since the auxiliary winding 7 does not induce a voltage in this charging period because of its saturated condition, the reactor 17 is magnetized by the voltage-time integral designated by D and demagnetized by a voltage-time integral designated by E. When the voltage $V_3$ drops below the voltage $V_{12}$, a bias voltage is applied to the rectifier 10 reversely to its forward direction. Accordingly, the saturable reactors 16 and 17 are demagnetized respectively by voltage-time integrals each of which corresponds to either of two equally-divided parts of the voltage-time integral E.

As a result of this operation, the voltage-time integral ($S_{16}$) for magnetizing the saturable reactor 16 can be expressed as follows.

$$S_{16} = \frac{1}{2}A + B + C - \frac{1}{2}F \quad (3)$$

Moreover, the voltage-time integral $S_{17}$ for demagnetizing the saturable reactor 17 can be expressed as follows.

$$S_{17} = -\frac{1}{2}A + C - D + E + \frac{1}{2}F \quad (4)$$

Since the reactors 16 and 17 operate in the same manner with respect to each other as a result of the circuit arrangement shown in FIG. 1, it is clearly apparent that the reactor 16 is demagnetized by the value of $S_{17}$ given in Equation 4 before the time $t_1$ in the same manner as the reactor 17. That is, the reactor (16 or 17) is demagnetized by the value $S_{17}$ and then magnetized by the value $S_{16}$. Accordingly, the following relationship must be valid in accordance with the characteristics of a saturable reactor.

$$S_{17} = S_{16} \quad (5)$$

Therefore $$A + B + D = E + F \quad (6)$$

This Equation 6 indicates that the average value of the rectified output voltage is equal to the voltage of the D.C. source 14.

Figure 5:
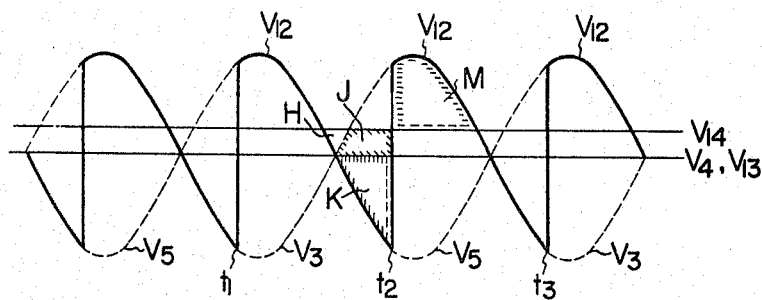

FIG. 5 shows a waveform diagram for describing the operation of the embodiment of the invention of FIG. 1 in which the inductive load (20, 21, 22) shown in FIG. 2C is employed as the load 15.

The waveforms indicate the voltages of the respective parts designated by corresponding subscripts. In order to simplify the description, it is assumed that the turn ratio of the main winding (6 or 8) to the auxiliary winding (7 or 9) is 2:1 in the saturable reactor (16 or 17). Moreover, it is assumed in FIG. 5 that the reactor 17 is in its saturated condition and supplies the rectified current in a period $t_1$ to $t_2$, and that the reactor 16 is in its saturated condition and supplies the rectified current in a period $t_2$ to $t_3$. Since the choke-coil 22 has a characteristic such as to maintain the rectified current at a constant value by its stored electromagnetic energy, the choke-coil 22 derives the rectified current, in the period $t_2$ to $t_3$, for instance, through the saturable reactor 16 from the terminal 3 even though the voltage $V_3$ becomes negative unless the saturable reactor 17 is saturated. Accordingly, the voltage $V_{12}$ coincides with the voltage $V_3$. Since the voltage $V_{12}$ drops below the voltage $V_{14}$ in the period when the voltage $V_{12}$ is equal to the voltage $V_5$, a current flows through the series-connected auxiliary windings 7 and 9 in the direction of arrow 18 and magnetizes the saturable reactor 16 by a voltage-time integral designated by H, j, and K. The reactor 16 reaches its saturated condition at a time $t_2$, so that the rectified current commutates to the circuit energized by the voltage $V_3$, and the rectified output $V_{12}$ becomes equal to the voltage $V_3$. After the time $t_2$, since the voltage $V_{12}$ exceeds the voltage $V_{14}$, a current flows through the series-connected auxiliary windings 7 and 9 in the direction reverse to that of arrow 18 and demagnetizes the reactor 17 by a voltage-time integral designated by M. Accordingly, the saturable reactor 16 is demagnetized by the voltage-time integral M before it is magnetized to its saturated condition. Since the voltage-time integral of magnetization for saturating the reactor (16 or 17) is equal to the voltage-time integral of demagnetization with respect to the same reactor, the following relationship is valid.

$$H + J + K = M \quad (7)$$

This Equation 7 indicates that the rectified output $V_{12}$ is equal to the voltage $V_{14}$ of the D.C. voltage source 14. Moreover, the choke-coil 22 operates so as to smooth the output voltage $V_{12}$. Accordingly, the voltage across the terminals of the capacitor 21 is substantially equal to the voltage $V_{14}$.

As is apparent from the above description, the demagnetization of the saturable reactor (16 or 17) for maintaining the rectified output voltage $V_{12}$ at a constant value (e.g., $V_{14}$) is accomplished by the use of a part of each cycle period of the input A.C. Accordingly, the response time with respect to fluctuations of the input A.C. voltage is shorter than one cycle period of the input A.C. voltage. Furthermore, the response time with respect to fluctuations of the load 15 is of negligible order.

In the cases of the resistance load 20 and the inductive load (20, 21, 22), the output voltage $V_{12}$ is maintained at a substantially constant value even if the value of the resistance 20 is varied, and the response time for compensating action with respect to fluctuations of the input A.C. voltage or fluctuations of the load 15 is shorter than one cycle period of the input A.C. voltage. In the case of the capacitive load (20, 21) shown in FIG. 2(b), the response time is longer than those of the other cases but shorter than a few cycles of the input A.C. voltage.

In the embodiment of the invention shown in FIG. 1, since the response time of the closed loop which is inclusive of the main windings (6 and 8), the auxiliary windings (7 and 9), the rectifiers (10 and 11), the D.C. voltage source 14, etc., is shorter than one cycle period of the input A.C., and the phase shift caused in the closed loop is always smaller than a value $\pi$, the resultant operation of this embodiment is carried out in an extremely stable manner without hunting or oscillatory operation.

Furthermore, since this excellent characteristic of maintaining a constant output voltage is obtained irrespective of the waveform or frequency of the input A.C. voltage as is apparent from the above analysis of operation, the rectifying apparatus of this invention can be used for applications in a wide range of fields.

Figure 6A:
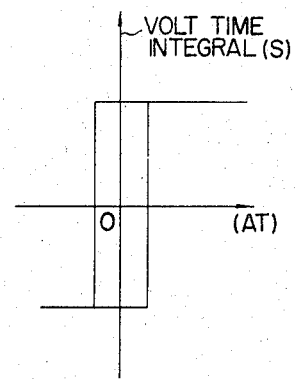
Figure 6B:
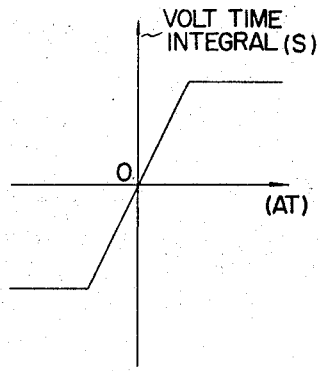

In all of the embodiments of this invention, any saturable reactor which has a magnetization characteristic of ring-core type (shown in FIG. 6(a)) or of cut-core type (shown in FIG. 6(b)) can be employed as the saturable reactor (16, 17 . . . ). Accordingly, it is easy to construct a high-power rectifying apparatus by means of saturable reactors using cut-cores which can be readily wound.

Figure 7:
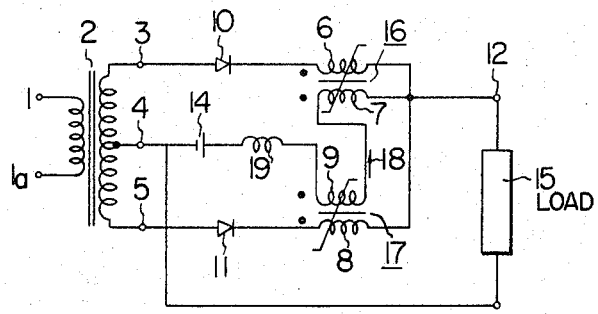

FIG. 7 shows another embodiment of this invention in which the arrangement is identical to that shown in FIG. 1 except for the following features: (1) the positions of the rectifier (10 or 11) and the saturable reactor (16 or 17) mutually interchanged and (2) an auxiliary reactor 19 is inserted in series into the series-connected circuit of the auxiliary windings 7 and 9 and the D.C. voltage source 14. Of course, the rectifier (10 or 11) and the saturable reactor (16 or 17) can be connected in the same arrangement as shown in FIG. 1.

The operation of this apparatus in which the reactors 16, 17 and 19 have a magnetization characteristic as shown in FIG. 6(a), and the current for changing the magnetic flux of the reactor 19 is less than those of the reactors 16 and 17 will be described.

The operation of this apparatus connected to the load 15 shown in FIG. 2(a) can be described with reference to FIG. 3(a) in comparison with the operation of the apparatus of FIG. 1. In the apparatus of FIG. 1, the voltagetime-integral A magnetizes the reactor 16, and in this period the magnetization current thereof is supplied from the D.C. voltage source 14 in the direction of arrow 18. In the apparatus of FIG. 7, however, a current corresponding to the magnetization current of the reactor 19 only flows into the series-connected auxiliary windings 7 and 9. Acordingly, only the reactor 19 is demagnetized by the voltage-time integral A. Since the demagnetization current in this case is less than a current necessary to change the magnetic flux of the saturable reactor 16, magnetization of the reactor 16 is carried out with the main winding 6 by the voltage-time integral $(B+C)$ only. Moreover, while demagnetization of the reactor 17 is carried out by the voltage-time integral $(C+D)$ in the apparatus shown in FIG. 1, demagnetization of the reactor 17 employed in the apparatus of FIG. 7 is carried out by the voltage-time integral $(C+D-A)$. The reason for this is that after the voltage $V_3$ exceeds the voltage $V_{14}$ the direction of the curent flowing through the series-connected auxiliary windings 7 and 9 is reversed, and the reactor 19 is magnetized by the voltage-time integral A by which the reactor 19 was demagnetized just before. After the saturation of the reactor 19, the current through the reactor 19 can take a larger value sufficient to demagnetize the reactor 17.

As is apparent from the above edscription, Equation 2 is valid also in the apparatus shown in FIG. 7. Accordingly, this apparatus also produces a substantially constant output D.C. voltage. Moreover, this has the advantage of the voltage-etime integral applied to the saturable reactor (16 or 17) being smaller by the area A than that of the apparatus shown in FIG. 1.

The operation of the apparatus of FIG. 7 connected to the load 15 shown in FIG. 2(c) can be described with reference to FIG. 5. The voltage-time integral for demagnetizing the reactor 19, which integral is induced by a current flowing therethrough in the same direction of arrow 18 is the areas H and J, and the voltage-time integral for magnetizing the reactor 16 is equal to the area K. Since demagnetization of the saturable reactor 17 is carried out, in the area M, after the reactor 19 reaches its saturated condition, the voltage-time integral for demagnetizing the reactor 17 is equal to the area $(M-H-J)$. This magnitude of demagnetization is the same as that in the reactor 16, so that the same relationship as Equation 7 is valid as follows.

$$K = M - H - J \tag{8}$$

In this arrangement, the voltage-time integral applied to the reactor (16 or 17) is smaller by the area $(H+J)$ than that of the arrangement shown in FIG. 1.

The operation of the apparatus of FIG. 7 connected to the load 15 shown in FIG. 2(b) can be described with reference to FIG. 4. In this case, the voltage-time integral applied to the reactor (16 or 17) is not reduced as much as in the preceding two cases. The reactor 19 inserted operates so as to balance the rectified currents with respect to the voltages $V_3$ and $V_5$. While the voltage-time integral A of FIG. 4 is applied divisionally to the reactors 16 and 17 in the arrangement shown in FIG. 1, the voltage-time integral A is applied only to the reactor 19 in this arrangement shown in FIG. 7. Accordingly, the operations of the reactors 16 and 17 are balanced regardless of the small difference between their respective characteristics.

In the above description with respect to the embodiments of the invention shown in FIGS. 1 and 7, it is assumed that cores of the saturable reactors have a rectangular hysteresis loop. However, this characteristic of the cores is not always essential to achieve the objects of the invention. Cores each having a hysteresis loop as shown in FIG. 6 are also usable in these apparatuses. The reason for this will be apparent from the following description. Positive and negative voltage-time integrals which are applied to the terminals of a reactor are proportional to the magnitude of the change of flux at its core and must be equal to each other. Accordingly, the average value of the voltage across the terminals of the reactor is zero provided that the resistance of the winding of the reactor is negligible. That is, in view of such characteristics of the series-connected auxiliary windings 7 and 9 and the reactor 9, the voltage $V_{12}$ is substantially equal to the voltage $V_{14}$. In other words, the reactors 16 and 17 control the rectified current so as to realize these characteristics. All embodiments of this invention are so composed and arranged as to fulfil this principle of "the average value of voltage-time integrals applied to a reactor is zero," thereby to make the rectified output voltage $V_{12}$ equal to the voltage $V_{14}$ of the D.C. voltage source 14. The D.C. voltage source 14, the voltage of which is used as a reference for the operation of the rectifying apparatus of this invention, can be employed if it has a current-capacity which is sufficient to supplly the magnetizing current to the reactor (16, 17 or 19).

Figure 8:
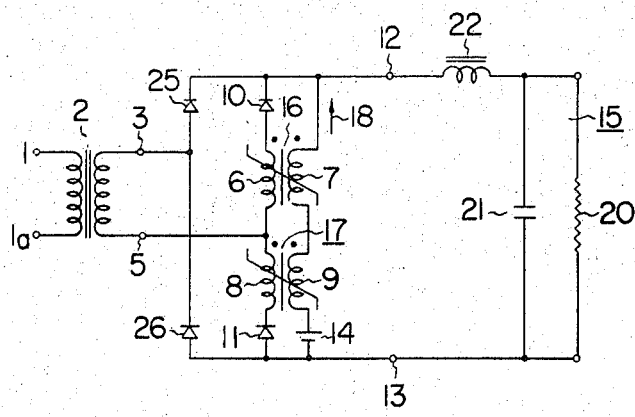
Figure 9:
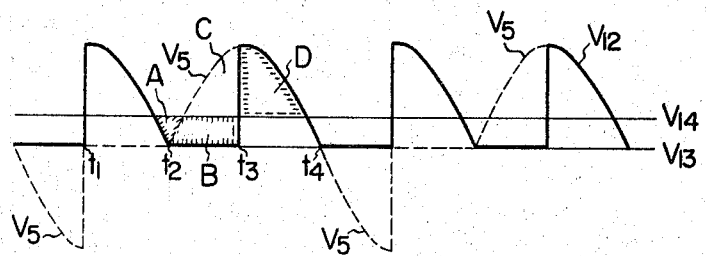
FIGS. 9 and 11 are waveform diagrams indicating the operations of the embodiments shown in FIGS. 8 and 10, respectively.

Referring to FIGS. 8 and 9, another embodiment of this invention will be described. In this apparatus, one terminal of each of the reactor-rectifier combinations each composed of a rectifier (10 or 11) and a main winding (6 or 8) of the saturable reactor (16 or 17) is connected to the terminal 5 of the A.C. source 2, and the other terminals of the reactor-rectifier combinations are, respectively, connected to the output terminals 12 and 13. The terminal 3 is connected to the output terminals 12 and 13 through the rectifiers 25 and 26, respectively. The series-connected circuit composed of the auxiliary windings 7 and 9 and the D.C. voltage source 14 is connected in parallel with the output terminals 12 and 13. The load 15 is composed of a choke coil 22, a capacitor 21 and a resistance 20 as shown in FIG. 2C, but loads of other types can be employed as described above. This rectifying circuit is a bridge arrangement for full-wave rectification of a single-phase alternating current.

The operation of this embodiment will be described with reference to FIG. 9. The reactor 17 is saturated in a period ($t_1$ to $t_2$), and the reactor 16 is saturated in a actor 16 is magnetized, the rectified current is suppressed, period ($t_3$ to $t_4$.) In a period ($t_2$ to $t_3$) in which the reand electro-magnetic energy stored in the choke-coil 22 causes a current to flow through the rectifiers 25 and 26. To simplify the description of the operation of this apparatus, it is assumed that the turn ratio of the main winding to the auxiliary winding is 1:1 in each of the reactors 16 and 17. Magnetization of the reactor 16 is effected in a period over an area A by passing a current in the direction of arrow 18 into the series-connected auxiliary windings 7 and 9 and in a period over an area C by the rectified current flowing through the main winding 6. This rectified current flowing through the main winding 6 generates the voltage-time integral C in the auxiliary winding 7, thereby to cause the flow in the direction reverse to that of the arrow 18 of a current which demagnetizes the saturable reactor 17. After the saturable reactor 16 reaches its saturation condition, the saturable reactor 17 is further demagnetized by a voltage-time integral D. In this period, since the reactor 16 is maintained in its saturated condition by the rectified current flowing through the main winding 6, the reactor 16 is not demagnetized by the voltage-time integral D applied to the auxiliary windings 7 and 9. After a time $t_4$, the voltage $V_5$ drops below zero potential because of the suppression action of the saturable reactor 17. When the reactor 17 reaches its saturated condition after magnetization by the demagnetizing voltage-time integral $(C+D)$, the voltage $V_5$ becomes equal to the zero potential.

As is apparent from the above description, the output voltage $V_{12}$ and voltages generated across the saturated reactors 16 and 17 are the same as those shown in FIG. 3(a). Accordingly, the characteristic of this apparatus for stabilizing the average value of the rectified output is seen to be analogous to that expressed by Equation 1 and 2. Description of the operation of this embodiment of the invention employing loads of other types is omitted because it can be readily understood by analogy from the description with respect to the example of FIG. 1. Moreover, it is possible to insert a reactor (the reactor 19 in the FIG. 7) into the series-connected auxiliary windings 7 and 9 to reduce the magnitude of the voltage-time integral to be suppressed by the saturable reactors 16 and 17.

Figure 10:
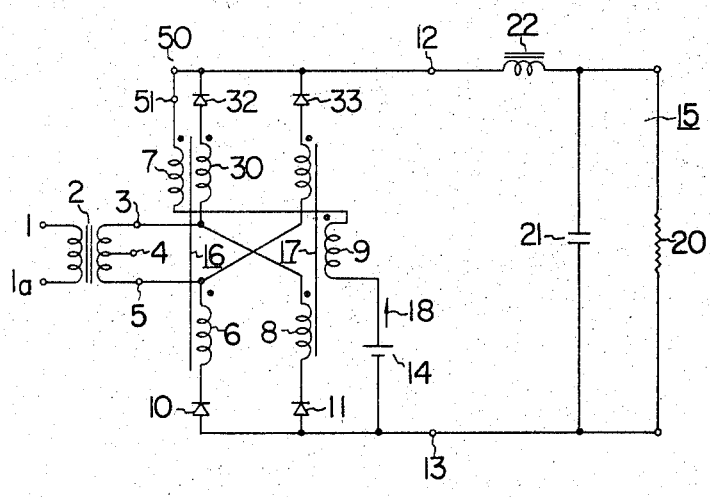

FIG. 10 shows another embodiment of this invention, in which the saturable reactor 16 is composed of main windings 6 and 30 and an auxiliary winding 7 all of which are wound on a common core, and the saturable reactor 17 is composed of main windings 8 and 31 and an auxiliary winding 9 all of which are wound on a common core. The main windings 6, 8, 30, and 31 and the rectifiers 10, 11, 32 and 33 are respectively connected to each other so as to form a full-wave rectification circuit of bridge type which is connected to terminals 3 and 5 of the A.C. source. The auxiliary windings 7 and 8 and the D.C. voltage source 14 are connected in series, the series-connected circuit thus formed being connected in parallel with the output terminals 12 and 13. The load 15 is, for example, as shown in FIG. 2C.

Figure 11:
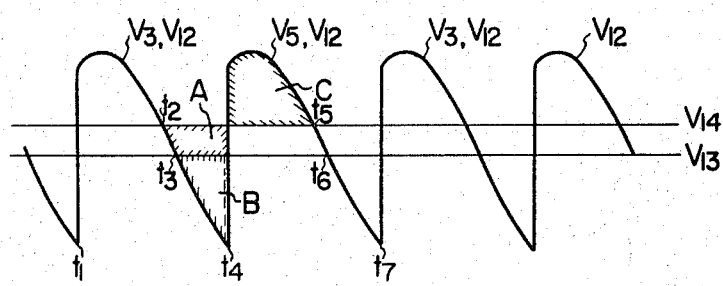

Referring to FIG. 11, the operation of this embodiment will be described. In a period ($t_1$ to $t_2$), where the saturable reactor 16 is in its saturated condition, the rectified current is supplied through the main windings 6 and 30, and the output voltage $V_{12}$ is equal to the voltage $V_3$. In a period ($t_4$ to $t_7$) where the saturable reactor 17 is in its saturated condition, the voltage $V_{12}$ is equal to the voltage $V_5$. The operations of magnetization and demagnetization of these reactors 16 and 17 in which the turn ratio of respective windings on the common core is 1:1:1 are as follows. Since the voltage $V_{12}$ drops below the voltage $V_{14}$ after a time $t_2$, a current flows in the series-connected auxiliary windings in the direction of arrow 18 and magnetizes the saturable reactor 17. After a time $t_3$ when the voltage $V_{12}$ (i.e.; $V_3$) drops below zero potential, the rectifiers 11 and 33 become conductive, and a voltage-time integral B is applied across the main windings 8 and 31. In a period ($t_4$ to $t_5$) in which the voltage $V_{12}$ exceeds the voltage $V_{14}$, a current flows in the series-connected auxiliary windings 7 and 9 in the direction reverse to that of arrow 18 and demagnetizes, by a voltage-time integral C, the saturable reactor 16, through whose windings 6 and 30 the rectified current is not passed. In a period $t_5$ to $t_7$, the saturable reactor 16 is magnetized because the reactor 17 has been magnetized in the period ($t_2$ to $t_4$). As is apparent from the above description, the following relationship is valid.

$$A+B=C \qquad (9)$$

Accordingly, the average value of the rectified output is equal to the voltage $V_{14}$.

A modification of this embodiment of the invention can be made by changing the arrangement as follows: (1) one terminal 5 of the auxiliary winding 7 is separated from a connection point 50; (2) the terminal 51 is then connected to the neutral point 4 between the A.C. terminals 3 and 5. In this modified arrangement, since the terminal 4 divides equally the voltage $V_{12}$, the same operative waveforms as shown in FIG. 11 are obtained by reducing the voltage $V_{14}$ to its half value. In other words, the average value of the rectified output of this modification is equal to twice the value $V_{14}$.

Moreover, a reactor saturable with a small value of ampere turns can be inserted in series into the series connection of the auxiliary windings 7 and 9 in both the arrangement of FIG. 10 and the above-mentioned modified arrangement thereof to reduce the voltage-time integrals of the saturable reactors 16 and 17.

In the operative waveforms as shown in FIGS. 5 and 11, the voltage $V_{12}$ drops frequently below zero potential. In order to prevent this drop of the voltage $V_{12}$, it is possible to employ a rectifier as a "commutator" the plate of which is connected to the output terminal 13, and the cathode of which is connected to the output terminal 12.

While the above described embodiments of the invention relate to rectifying circuit arrangements for single-phase alternating current, this invention is also applicable to rectifying circuit arrangements for three-phase alternating current.

Figure 12:
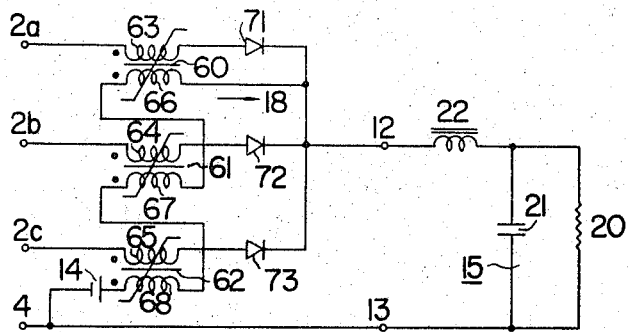
FIG. 12 is a circuit diagram of another embodiment of this invention applied to half-wave rectification of three-phase A.C. power.

FIG. 12 shows one example of application to three-phase alternating current, to form a half-wave rectification circuit. Three series combinations each composed of a rectifier (71, 72 or 73) and a main winding (63, 64 or 65) of a saturable reactor (60, 61 or 62) are connected to input terminals $2_a$, $2_b$ and $2_c$ of a three-phase A.C. source, respectively, and commonly to an output terminal 12. The neutral terminal 4 of the A.C. source is employed as an output terminal 13. The series-connection circuit composed of three auxiliary windings 66, 67 and 68 and a D.C. voltage source 14 is connected in parallel with the output terminals 12 and 13. In this arrangement, the load 15 as shown in FIG. 2(c) is employed. Of course, a reactor saturable with relatively small ampere turns can be inserted in series with the series-connected auxiliary windings to reduce the capacity of the voltage-time integral of the reactors 60, 61 and 62 (claim 2).

Figure 13:
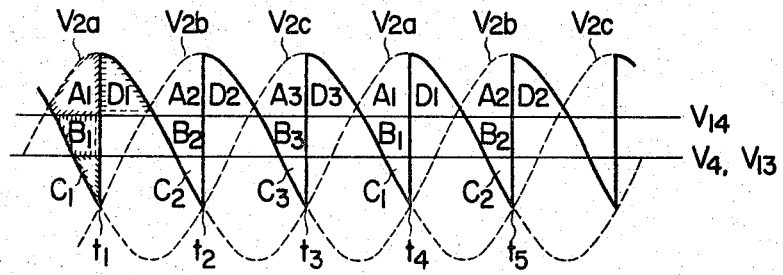
FIG. 13 is a waveform diagram indicating the operation of the apparatus shown in FIG. 12.

The operation of this embodiment will be described with reference to FIG. 13. At periods ($t_1$ to $t_2$), ($t_2$ to $t_3$) and ($t_3$ to $t_4$), the saturable reactors 60, 61 and 62 are successively in their saturated conditions and supply rectified current successively. In partial periods of the respective periods, the reactors are successively magnetized in the order of 61, 62 and 60 by voltage-time integrals ($A_2+B_2+C_2$), ($A_3+B_3+C_3$) and ($A_1+B_1+C_1$), respectively. If it is assumed that the turn ratio of the main winding (63, 64 or 65) to the auxiliary winding (66, 67 or 68) is 1:1, in the auxiliary windings 66, 67 and 68, there are successively induced in the order of these numbers said resepctive voltage-time integrals each of which demagnetizes one of the saturable reactors (62, 60 and 61), through which no rectifying current flows during their respective period. In this case, the voltage-time integral for demagnetization (S) is obtained as follows for the saturable reactor 60.

$$S = \tfrac{1}{2}D_2 + A_3 + \tfrac{1}{2}D_3$$

This voltage-time integral S is to be equal to the voltage-time integral ($A_1+B_1+C_1$); therefore, the following relationship is valid.

$$\tfrac{1}{2}D_2 + \tfrac{1}{2}D_3 + A_3 = A_1+B_1+C_1 \qquad (10)$$

If the three recttifiers 60, 61 and 62 have the same characteristics, it is clearly apparent that $D_2=D_3$ and $A_1=A_2$. Therefore, $$D_3 = B_1+C_1 \qquad (11)$$

As for the other reactors 61 and 62, similar equations can be obtained. Accordingly, the average voltage of the rectified output is equal to the voltage $V_{14}$ of the D.C. source 14 in this arrangement.

Referring to FIGS. 14 and 15, an embodiment of this invention applied to full-wave rectification of three phase A.C. power will be described. Six series-connections each composed of a rectifier (71, 72, 73, 74, 75 or 76) and a main winding (86, 88, 90, 92, 94 or 96) are connected respectively to terminals $2_a$, $2_b$ and $2_c$ of a three-phase A.C. source and to output terminals 12 and 13, thereby to form a full-wave rectification circuit for three-phase alternating current. The three groups of series-connected auxiliary windings (87 and 93), (89 and 95), and (91 and 97) are respectively connected in series to auxiliary saturable reactors of small current capacity (100, 101 and 102) and a D.C. voltage source 14. One terminal 50 of the D.C. voltage source 14 is connected to a neutral terminal 4 of the three-phase A.C. source. The other remaining terminals of the reactors (100, 101, and 102) are connected commonly to the output terminal 12. According to this arrangement, the difference voltage between the voltage $V_{14}$ of the D.C. source 14 and the voltage across terminals 12 and 4 is applied to each of three-connection circuits each of which is composed of two auxiliary windings (87 and 93), (89 and 95) or (91 and 97) and an auxiliary reactor (100, 101 or 102).

FIG. 15 is a waveform diagram indicating the operation of the apparatus of FIG. 14 in which the load 15 shown in FIG. 2(c) is applied. It is assumed that the reactors (80 to 85) and the auxiliary reactors (100 to 102) have the hysteresis characteristic shown in FIG. 6(a) and that the magnetization currents of the auxiliary reactors (100 to 102) are smaller than those of the main saturable reactors (80 to 85). It is further assumed that the direction of the magnetization current of the auxiliary reactor (100, 101 or 102) is reverse to that of the arrow (103, 104 or 105) shown. Then, the operation is as follows.

(a) The auxiliary reactor 100 is demagnetized by a voltage-time integral $B_1$.

(B) The saturable reactor 80 is saturated by a voltage-time integral $(A_1+C_1+D_1)$.

(c) The saturable reactor 83 is demagnetized by a voltage-time integral corresponding to the difference between voltage-time integrals $(A+E_1)$ and $B_1$. In this period, the auxiliary reactor 100 reaches its saturated condition.

(d) The auxiliary reactor 100 is demagnetized by a voltage-time integral $(A_2+B_2+C_2+D_2)$.

(e) The saturable reactor 83 is magnetized by a voltage-time integral $(F_1+G_1)$ and reaches its saturated condition.

(f) The saturable reactor 80 is demagnetized by a voltage-time integral corresponding to the difference between voltage-time integrals $(F_2+F_1+G_1)$ and $$(A_2+B_2+C_2+D_2)$$

In this period, the auxiliary reactor 100 reaches its saturated condition.

(g) The auxiliary reactor 100 is demagnetized by a voltage-time integral $(B_3+C_3+D_3)$ and magnetized by a voltage-time integral $E_3$ to reach its saturated condition.

To above operations (a) to (g) relate to one cycle of the operations of the reactors 80, 83 and 100 which are coupled with terminal $2_a$. Similar operations are performed with respect to the other saturable reactors coupled with the other terminals $2_b$ and $2_c$ of the A.C. source. It is understood that the average value of the voltage $V_{12}$ at the terminal 12 is to be equal to the voltage $V_{14}$ in order to carry out the above operations (a) to (g) with respect to all saturable reactors. Accordingly, the average value of the voltage between the output terminals 12 and 13 is equal to twice the voltage $V_{14}$ of the D.C. voltage sources 14.

FIG. 16 shows a modified arrangement of the apparatus of FIG. 14. In this modified arrangement, the auxiliary reactors 100 to 102 are omitted, and the terminal 50 of the D.C. voltage source 14 is connected to output terminal 13.

The operation of this modification can be described with reference to FIG. 17 with respect particularly to saturable reactors 80 and 83. The reactor 80 is magnetized by a voltage-time integral $(A_1+B_1)$ and the reactor 83 is demagnetized by a voltage-time integral $(A_1+C_1-B_1)$. Voltage-time integrals each of which corresponds to half a voltage-time integral $(C_2-B_3+C_3)$ demagnetize, respectively, the saturable reactors 80 and 83. The reactor 83 is thereafter magnetized by a voltage-time integral $(A_1+B_1)$.

The above description relates to a half cycle of the operations of these reactors. The full cycle of their operations is summarized as follows. The reactors 80 and 83 are demagnetized by a voltage-time integral $$(A_1+C_1-B_2+2(\tfrac{1}{2}C_2-\tfrac{1}{2}B_3+\tfrac{1}{2}C_3))$$

and magnetized by a voltage-time integral $(A_1+B_1)$. These two voltage-time integrals are equal due to a characteristic of a saturable reactor. Therefore, the following relationships are obtained.

$$A_1+B_1=A_1+C_1-B_2+C_2-B_3+C_3 \qquad (11)$$
$$B_1+B_2+B_3=C_1+C_2+C_3 \qquad (12)$$

Equation 12 indicates that the average value of the output voltage $V_{12}$ is equal to the voltage $V_{14}$.

Figure 18:
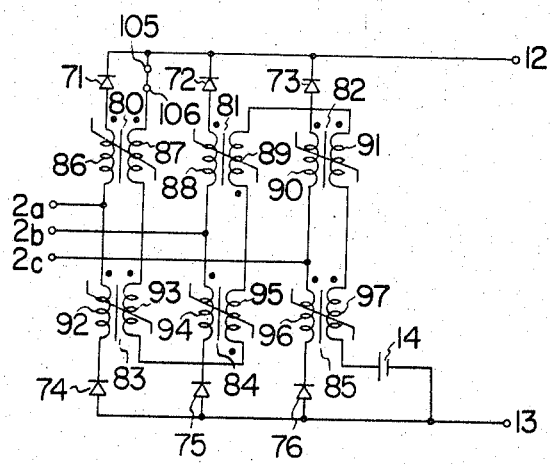

FIG. 18 shows still another embodiment of this invention in which all of the auxiliary windings 87, 89, 91, 93, 95 and 97 and the D.C. voltage source 14 connected in series are further connected in parallel with output terminals 12 and 13. One terminal 106 of the auxiliary winding 87 can be separated from a terminal 105 and connected to the neutral point 4 of the A.C. source.

Figure 19:
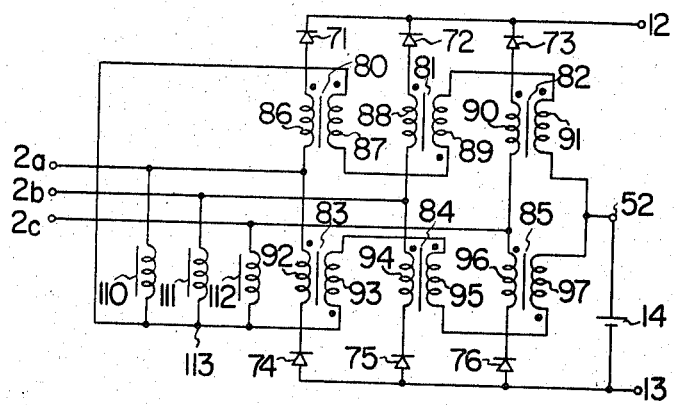

FIG. 19 shows another embodiment of this invention applicable to a three-phase A.C. source having no neutral terminal. One terminal of each of the auxiliary reactors 110, 111 and 112 is connected to a terminal ($2a$, $2b$ or $2c$) of the A.C. source, and each of the remaining terminals thereof is connected so as to form an equivalent neutral terminal 13. Two groups of auxiliary windings (87, 89 and 91) and (93, 95 and 97) are inserted between the terminal 113 and the D.C. voltage source 14, one terminal of which is connected to the output terminal 13.

In all of above described embodiments of the invention, it is assumed that the resistance $Rc$ of the series-connected auxiliary windings of the saturable reactor (and the auxiliary reactor) is negligible. But since the resistance $Rc$ is not negligible in a practical device, there arises the following difficulty. Which will be particularly described with respect to the apparatus of FIG. 1, as an example, with reference to FIG. 5. A voltage-time integral $Ma$ for demagnetizing the saturable reactor 16 in a period ($t_1$ to $t_{1a}$) is equal to a voltage-time integral $(H+J+K)$ for magnetizing the same saturable reactor 16 in a period ($t_{1a}$ to $t_2$). Accordingly, following relationships are valid.

$$V_7=V_{14}-V_{12}-Rc.i_c \qquad (13)$$

where:

$V_7$=A.C. voltage across the winding 7;
$i_c$=a control current flowing through the series-connected auxiliary windings 7 and 9.

$$\int_{t_1}^{t_2} V_7 \cdot dt = \int_{t_1}^{t_2}(V_{14}-V_{12}-Rc \cdot i_c)dt=0 \qquad (14)$$

From Equation 14, the average value $V_{12}$ of the voltage $V_{12}$ is obtained.

$$V_{12}=V_{14}-\frac{R_c}{(t_2-t_1)}\int_{t_2}^{t_1} i_c \cdot dt \qquad (15)$$

The second term of the right side of Equation 15 is a product of the resistance $Rc$ and the average $i_c$. Accordingly, the stability of the average value $V_{12}$ decreases by the product $Rc.i_c$.

To overcome this imperfection, a D.C. voltage source 14 as shown in FIG. 20, for instance, which has a negative internal resistance ($Rs=-Rc$) can be employed in all of the embodiments of the invention. Referring now to FIG. 20, terminals 23 and 24 of this source 14 respectively correspond to terminals 23 and 24 shown in FIG. 1. A D.C. voltage from a D.C. source $Eo$, such as a battery, is reduced, by an appropriate voltage through a transistor $Tr_1$ and then supplied to the terminals 23 and 24. The relationship between a voltage $Es$ and a current $i_c$ applied at the terminals 23 and 24 is given as follows.

$$Es=k.E_2(1-k)E_1 \qquad (16)$$

where:

$E_2$=a constant voltage appearing across a Zener diode 41.
$E_1$=terminal voltage of the resistance $R_1$,
$k=(r_2+r_3)/r_3$ ($r_1$, $r_2$ and $r_3$ are respectively values of resistance $R_1$, $R_2$ and $R_3$)

The terminal voltage $E_1$ is substantially equal to the value $r_1.i_c$. Therefore, from Equation 16 by a value $i_c$, the following relationship is valid.

$$Es \approx k.E_2 + (1-k)r_1.i_c \quad (17)$$

By differentiating Equation 17, the internal resistance $Rs$ of the circuit of FIG. 20 as considered from the terminals 23 and 24 is obtained as follows.

$$Rs = dEs/di_c = (1-k).r_1 \quad (18)$$

Since the constant $k$ is greater than unity, the value of the resistance $Rs$ is negative. Accordingly, if the absolute value of the resistance $Rs$ is established so as to equal the value $Rc$, the imperfection caused by the existence of the resistance $Rc$ can be completely removed.

In all of the embodiments of the invention applied to the load 15 shown in FIG. 2C, the D.C. voltage applied to the load resistance 20 is reduced by a voltage drop which appears across a resistance component of the reactor 22, from the input voltage of the reactor 22. If a current $Io$ derived from the recator 22 to the resistance 20 is fluctuated by a change in the value of the resistance 20, the terminal voltage of the resistance 20 is varied in accordance with the fluctuation of the voltage drop on the reactor 22 as mentioned above even though the voltge $V_{12}$ is maintained at a constant average value $V_{12}$. This imperfection can be overcome by an embodiment of the present invention as shown in FIG. 21.

This embodiment is different from the embodiment shown in FIG. 1 in only the following features: (1) the choke coil 22 has a primary winding $22_a$ and a secondary winding $22_b$; and (2) the series-connected auxiliary windings 9 and 7 are connected in series to the secondary winding $22_b$. A terminal $12_a$ of the secondary winding $22_b$ has the same A.C. potential as (or proportional to) the potential $V_{12}$ but has a D.C. potential lower, by a value $R.Io$ (where "R" is the resistance of the winding $22_a$), than the D.C. potential of the terminal 12. Accordingly, since a voltage $V_{12a}$ appearing at the terminal $12_a$ is higher than the voltage $V_{14}$ by the value $R.Io$, the D.C. potential of the output terminal $O_1$ is maintained at a value substantially or exactly equal to the voltage $V_{14}$.

As described above, the average value of the rectified output $V_{12}$ is maintained at a constant voltage proportional to the voltage $V_{14}$ of the D.C. voltage source 14. It is therefore easily understood that the average value can be varied in accordance with the variation of the voltage $V_{14}$ so as to be adjusted to a desired value.

Moreover, although the present invention has been described by way of illustration with reference to typical embodiments thereof comprising certain elements in combination and having certain circuit arrangements, it will be apparent to those skilled in the art that the teachings of the present invention may be applied in a variety of forms to embodiments comprising other elements in different circuit arrangements than those herein disclosed within the true spirit and scope of this invention.

What we claim is:

1. A rectifying apparatus comprising input terminals for connection to a source of alternating voltage, output terminals for connection to a direct current load, a plurality of saturable reactors each having main and auxiliary windings, a plurality of rectifiers connected respectively in series with the main windings of said saturable reactors to form reactor-rectifier combinations connected between said input and output terminals, and control means for controlling said reactor-rectifier combinations to commutate the current flowing in said main windings, said control means comprising at least one series-connection of at least two of the auxiliary windings and a direct current voltage source and applying to the series connection of the auxiliary windings of those reactor-rectifier combinations which are conductive in different periods of the alternating voltage a voltage which is a function of the difference between the direct current reference voltage of said source and the voltage appearing in operation at said output terminals, whereby to provide a stabilized direct current voltage at said output terminals.

2. A rectifying apparatus according to claim 1, in which said control means includes a further auxiliary saturable reactor arranged in series with said series connection, said further reactor being saturated by a current passing therethrough which is smaller than the current through said auxiliary windings at which the first said saturable reactors saturate.

3. A rectifying apparatus according to claim 1, in which said reactor-rectifier combinations are connected to said output terminals through the primary winding of a choke-coil, said control means including further in series a secondary winding of the choke-coil.

4. A rectifying apparatus according to claim 1, in which the direct voltage source has a negative internal resistance adjusted to compensate for the resistance of said series connection.

References Cited

UNITED STATES PATENTS

| | | | |
|---|---|---|---|
| 3,210,637 | 10/1965 | Gams | 321—25 X |
| 3,217,239 | 11/1965 | Lunney | 321—25 X |
| 3,225,283 | 12/1965 | Kurimura et al. | 321—25 X |
| 3,353,084 | 11/1967 | Kurimura | 321—25 |

JOHN F. COUCH, *Primary Examiner.*

G. GOLDBERG, *Assistant Examiner.*

U.S. Cl. X.R.

321—25; 323—56, 89